(12) United States Patent
Conneely

(10) Patent No.: US 8,403,784 B2
(45) Date of Patent: Mar. 26, 2013

(54) TOOL FOR HANDLING SERPENTINE BELT

(76) Inventor: Peter Conneely, Walpole, MA (US)

( * ) Notice: Subject to any disclaimer, the term of this patent is extended or adjusted under 35 U.S.C. 154(b) by 774 days.

(21) Appl. No.: 12/551,706

(22) Filed: Sep. 1, 2009

(65) Prior Publication Data

US 2010/0069186 A1 Mar. 18, 2010

Related U.S. Application Data

(60) Provisional application No. 61/096,928, filed on Sep. 15, 2008.

(51) Int. Cl.
*F16H 7/22* (2006.01)
(52) U.S. Cl. .................................................. 474/130
(58) Field of Classification Search .................. 474/101, 474/119, 130; 254/240, 242–4, 250; 294/111
See application file for complete search history.

(56) References Cited

U.S. PATENT DOCUMENTS

| 4,669,769 A * | 6/1987 | Polder, Jr. .................. 294/111 |
| 5,653,654 A | 8/1997 | Davis |
| 6,257,634 B1 * | 7/2001 | Wei ............................. 294/111 |
| 7,024,745 B1 * | 4/2006 | Mayer ......................... 29/402.08 |
| 7,192,006 B1 * | 3/2007 | Moore .......................... 254/131 |
| 7,250,016 B1 * | 7/2007 | Petit ............................. 474/130 |

OTHER PUBLICATIONS

Tooltopia.com, KD Tools (KDT3684) Serpentine Belt Grabber Tool, http://www.tooltopia.com/kd-tools-3684. May 9, 2012.*

* cited by examiner

*Primary Examiner* — William E Dondero
*Assistant Examiner* — Robert T Reese
(74) *Attorney, Agent, or Firm* — L. C. Begin & Associates, PLLC

(57) ABSTRACT

A tool is provided for accessing and handling a belt, such as a serpentine belt, that revolves around pulleys and gears on or in proximity to an engine in a vehicle. For example, the serpentine belt may be accessed, gripped, guided around the pulleys and gears, removed from the pulleys and/or gears and installed on the pulleys and/or gears by utilizing the tool. Further, is not limited to handling of the serpentine belt being utilized in the vehicles, and can be utilized for handling various other belts also.

7 Claims, 3 Drawing Sheets

TOOL FOR HANDLING SERPENTINE BELT

CROSS REFERENCE TO RELATED APPLICATION

The present disclosure claims priority under 35 United States Code, Section 119 on the U.S. Provisional Patent Application No. 61/096,928 filed on Sep. 15, 2008, the disclosure of which is incorporated by reference.

FIELD OF THE DISCLOSURE

The present disclosure relates generally to hand tools, and more particularly, to a tool for handling a serpentine belt.

BACKGROUND OF THE DISCLOSURE

In automotive industries, belts are used to drive various components of a vehicle. Examples of such components include power steering, alternator, water pump, AC compressor and the like. Typically, the belts transfer power from an engine of the vehicle to these components for driving them. These days, instead of employing belts individually for each of the components, a single belt is employed for driving all such components in the vehicle. Such a belt, conventionally known as a serpentine belt, routes around various pulleys and idler gears associated with various components of the vehicle.

With consistent use thereof, the serpentine belt undergoes wear and tear over a period of time. Consequently, the serpentine belt may slip off from one or more of the pulleys and/or idler gears associated with the various components of the vehicle. Slipping off of the serpentine belt from the pulleys/idler gear leads to increase in load on the engine, more power consumption or failure in the power transmission to the components of the vehicle. Accordingly, the serpentine belt requires maintenance or replacement from time to time. During replacement or maintenance thereof, the serpentine belt may be installed, removed, routed or adjusted on/from the pulleys and gears.

While installing, removing, routing, or adjusting the serpentine belt, it is required to handle the serpentine belt carefully due to various reasons. One of the reasons is availability of very less clearance while accessing the pulleys and gears of the engine under a hood of the vehicle. Due to this, it may be difficult to reach the serpentine belt for handling it.

Typically, a front-wheel-drive vehicle with a transversely mounted engine provides limited access to the serpentine belt, thereby necessitating lifting of the front wheel of the vehicle from the ground for accessing the serpentine belt. Further, in some vehicles, a splash shield needs to be removed for accessing the front portion of the engine for handling the serpentine belt. Such an activity of removing the splash shield for accessing of the serpentine belt is cumbersome for an individual handling the serpentine belt. Furthermore, in some other cases, handling of the serpentine belt is much more difficult when the engine is hot. Due to these above mentioned reasons, just accessing the serpentine belt can be a time consuming and unpleasant experience for any individual such as an automotive specialist.

Currently, a rod or a screwdriver may be used to adjust the belt on the pulley. However, the serpentine belt may be slipped off from the rod or the screwdriver while being adjusted. This may require additional effort to first adjust the serpentine belt on the rod or the screwdriver and thereafter, to adjust the serpentine belt on the pulleys and/or gears. Accordingly, handling the serpentine belt by using the rod or the screwdriver may be time consuming and tiresome for an individual handling the serpentine belt.

SUMMARY OF THE DISCLOSURE

One embodiment of a tool for handling a serpentine belt may include a hollow pipe that may have a longitudinal opening configured at a distal end portion thereof. Further, the hollow pipe may include a first griping member and a sleeve member. The first gripping member may be configured at the distal end portion of the hollow pipe and may be projected outwards from the longitudinal opening. Moreover, the sleeve member may be configured at a proximal end portion of the hollow pipe. The tool may also have a rod that may be partially enclosed and slidably engaged with the hollow pipe. Further, the rod may include a second gripping member that may be configured at a distal end portion thereof in a parallel relationship with the first gripping member. The second gripping member may project outwards from the longitudinal opening. The tool may also have a handle member that may be configured at a proximal end portion of the rod. Further, the tool may have a spring member that may be disposed between the sleeve member and the handle member. The spring member may be capable of being compressed upon directing the handle member toward the sleeve member, and retracted upon releasing the handle member. Furthermore, upon directing the handle member toward the sleeve member, the second gripping member may move toward the first gripping member to hold the serpentine belt therebetween for handling the serpentine belt.

BRIEF DESCRIPTION OF THE DRAWINGS

These and other features and advantages of the present invention will be apparent from the following detailed description of preferred embodiments and best mode, appended claims, and accompanying drawings in which:

Like reference numerals refer to like parts throughout the description of several views of the drawings.

DETAILED DESCRIPTION OF THE DISCLOSURE

The exemplary embodiments described herein provide detail for illustrative purposes, and are subject to many variations in composition, structure, and design. It should be emphasized, however, that the present disclosure is not limited to a particular tool for handling the serpentine belt, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

The present disclosure provides a tool for accessing and handling a belt, such as a serpentine belt, that revolves around pulleys and gears on or in proximity to an engine in a vehicle. It should be understood that the term 'handling,' as mentioned herein and throughout the present disclosure may refer to various actions performed upon holding or gripping the serpentine belt by means of the disclosed tool. For example, the serpentine belt may be accessed, gripped, guided around the pulleys and gears, removed from the pulleys and/or gears and installed on the pulleys and/or gears by utilizing the tool. Further, it will be apparent to a person skilled in the art that the tool is not limited to handling of the serpentine belt being utilized in the vehicles, and can be utilized for handling various other belts also. The tool of the present disclosure will now be explained in detail in conjunction with FIGS. 1, 2A and 2B.

Figure 1:
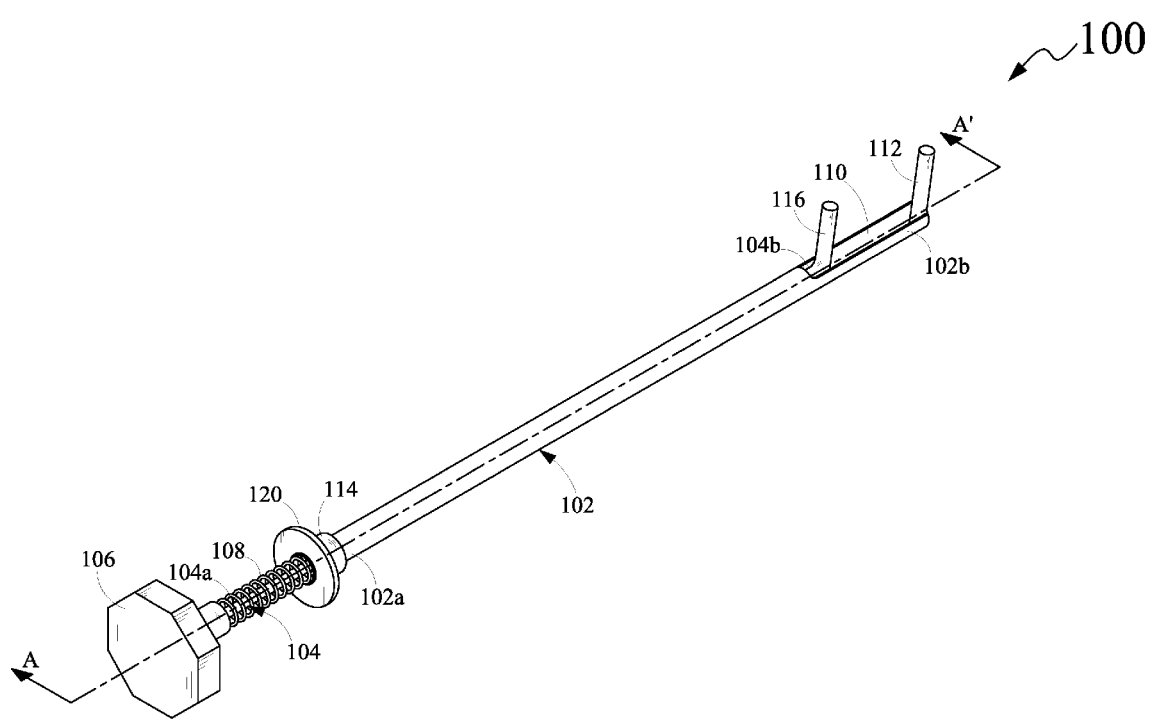
FIG. 1 is a perspective view of one embodiment of a tool for handling a serpentine belt.

Referring to FIG. 1, one embodiment of a tool 100 for handling the serpentine belt may include a hollow pipe 102 that may be an elongated pipe having a proximal end portion 102a and a distal end portion 102b. The hollow pipe 102 may include a longitudinal opening 110 at the distal end portion 102b thereof. The length of the longitudinal opening 110 may vary based on the manufacturing requirements of the tool 100. Further, the hollow pipe 102 may include a first gripping member 112 configured at the distal end portion 102b thereof such that the first gripping member 112 may project outward from the longitudinal opening 110. This first gripping member 112 may be fixedly configured on the distal end portion 102b of the hollow pipe 102. Further, the hollow pipe 102 may include a sleeve member 114 that may be configured at the proximal end portion 102a thereof. The hollow pipe 102 may be made of aluminum. However, the hollow pipe 102 may instead be made of other metals or non-metals as desired.

The tool 100 may also include a rod 104 that may be partially enclosed inside the hollow pipe 102 and slidably engaged with the hollow pipe 102. Specifically, the hollow pipe 102 may define a passageway (not shown) throughout the length thereof such that the rod 104 may be received in the passageway. Accordingly, the rod 104 may have a diameter that may be less than the inner diameter of the hollow pipe 102 thereby enabling the rod 104 to slidably engage with hollow pipe 102. Further, the rod 104 may be made of steel. Of course, the rod 104 may instead be made of other metals or non-metals.

The rod 104 may have a proximal end portion 104a and a distal end portion 104b. The rod 104 may include a second gripping member 116 that may be configured at the distal end portion 104b thereof. The second gripping member 116 may project outward from the longitudinal opening 110 of the hollow pipe 102 in a way such that the second gripping member 116 may be in parallel relationship with the first gripping member 112. Further, the first gripping member 112 and the second gripping member 116 may collectively configure an "F" shaped design to hold the serpentine belt of the vehicle therebetween. Hereinafter, the first gripping member 112 and the second gripping member 116 may collectively be referred to as "the gripping mechanism".

Figure 2A:
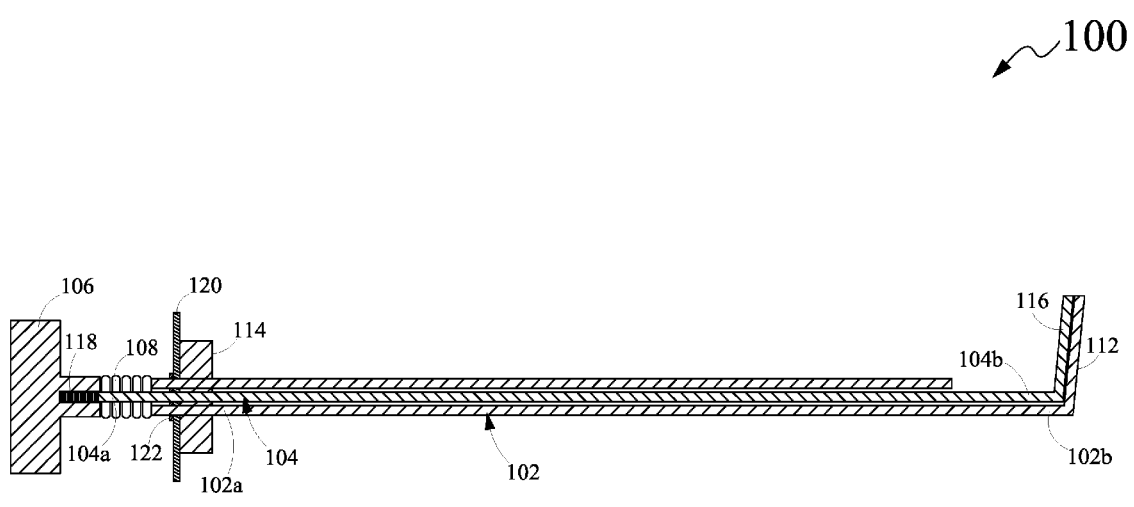
FIGS. 2A and FIG. 2B are schematic sectional views of the tool of FIG. 1, showing two different positions of the tool.
Figure 2B:
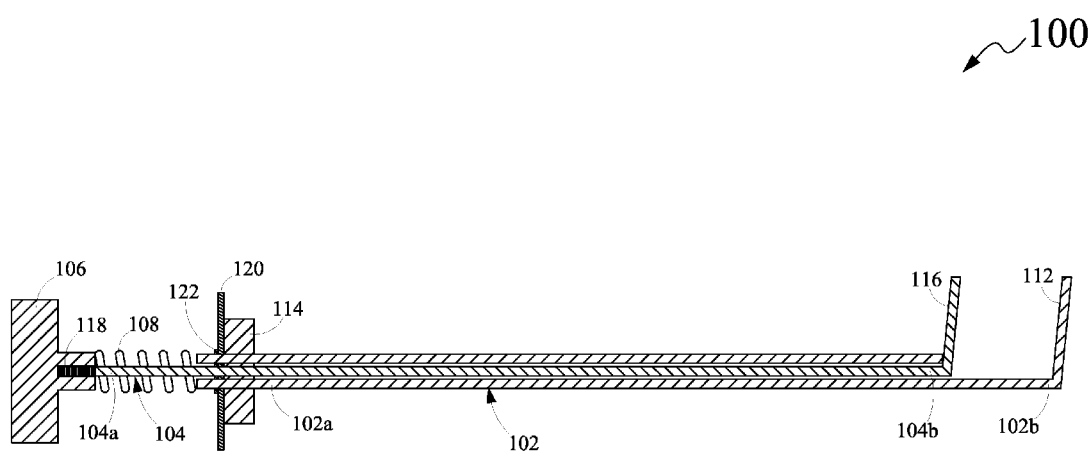

The tool 100 may further include a handle member 106 that may be configured at the proximal end portion 104a of the rod 104. As best shown in FIGS. 2A and 2B, the proximal end portion 104a of the rod 104 may include threads 118 (shown in FIGS. 2A and 2B) configured thereon that may engage with a threaded groove (not numbered) that may be configured inside the handle member 106 for fastening the handle member 106 with the rod 104. The handle member 106 may be directed toward the sleeve member 114 for providing slidable movement to the rod 104 inside the passageway of the hollow pipe 102. The slidable movement of the rod 104 moves the second gripping member 116 toward the first gripping member 112 for enabling the gripping mechanism to grip the serpentine belt.

Further, the tool 100 may include a spring member 108 for controlling the movement of the rod 104. The spring member 108 may be disposed between the sleeve member 114 and the handle member 106 such that upon directing the handle member 106 toward the sleeve member 114, the spring member 108 may be compressed and upon releasing the handle member 106, the spring member 108 may be retracted. The spring member 108 may be moved to a compressed state upon moving the handle member 106 toward the sleeve member 114, as described in detail in conjunction with FIG. 2A. Further, the spring member 108 may be moved to a retracted state upon releasing the handle member 106, as described in detail in conjunction with FIG. 2B.

The tool 100 may further include a washer 120 and a snap ring 122 (shown in FIGS. 2A and 2B) configured at the proximal end portion 102a of the hollow pipe 102. The washer 120 may facilitate distribution of load of the spring member 108 when the handle member 106 is directed toward the sleeve member 114. Moreover, the snap ring 122 may control the lateral movement of the rod 104 inside the hollow pipe 102 when the handle member 106 is directed toward the sleeve member 114.

Referring to FIG. 2A and FIG. 2B, there are shown schematic sectional views of the tool 100 (with respect to the sectional line AA' of the FIG. 1) depicting two different positions of the tool 100. Specifically, FIG. 2A illustrates the tool 100 with the handle member 106 moving toward the sleeve member 114, and FIG. 2B illustrates the tool 100 with the handle member 106 moving away from the sleeve member 114.

Referring to FIG. 2A, the rod 104 may be directed toward the distal end portion 102b of the hollow pipe 102 by directing the handle member 106 toward the sleeve member 114. Accordingly, the spring member 108 may be compressed. Moreover, the rod 104 may slidably move within the passageway of the hollow pipe 102, such that the second gripping member 116 may come toward the first gripping member 112. The movement of the second gripping member 116 toward the first gripping member 112 may facilitate holding the serpentine belt therebetween. The distance between the second gripping member 116 and the first gripping member 112 may be adjusted for gripping or holding the serpentine belts of varying thickness based on the movement of the rod 104.

Further, upon releasing the handle member 106, the spring member 108 may be retracted or uncompressed, as illustrated in FIG. 2B. The spring member 108 may remain retracted until the handle member 106 is moved toward the sleeve member 114 by application of a force thereon.

In one embodiment, the hollow pipe 102 may have a length of about 2 feet, an outside diameter of about 0.5 inches and an inside diameter of about 0.26 inches. Further, the rod 104 may have a diameter about 0.25 inches. As described herein, the components of the tool 100, such as the hollow pipe 102, the rod 104, and the handle member 106 may be of various designs and dimensions and is not limited to the design and dimensions as mentioned above. Further, the tool 100 may be of various designs and dimensions and may be composed of a variety of materials as mentioned above without deviating from the scope of the invention. Moreover, the tool 100 may be utilized in accessing and handling of any object other than the serpentine belt.

As described above, the present disclosure describes a tool, such as the tool 100 for handling the serpentine belt. The tool 100 may include means, such as the first gripping member 112 and the second gripping member 116, for holding the serpentine belt therebetween, thereby avoiding any slip of the serpentine belt while handling it. This may save time and effort of an individual handling the serpentine belt.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A tool for handling a serpentine belt comprising:
a hollow pipe having a longitudinal opening configured at a distal end portion thereof, the hollow pipe comprising,
a first gripping member configured at the distal end portion of the hollow pipe and projecting outwards from the longitudinal opening in a substantially perpendicular direction to the hollow pipe; and
a sleeve member configured at a proximal and portion thereof;
a rod partially enclosed and slidably engaged with the hollow pipe, the rod comprising a second gripping member configured at a distal and portion thereof in a parallel relationship with the first gripping member, the second gripping member projecting outwards from the longitudinal opening in a substantially perpendicular direction to the rod;
a handle member configured at a proximal end portion of the rod; and
a spring member disposed between the sleeve member and the handle member, the spring member capable of being compressed upon directing the handle member toward the sleeve member, and retracted upon releasing the handle member,
wherein upon directing the handle member toward the sleeve member, the second gripping member moves toward the first gripping member to hold the serpentine belt therebetween for handling the serpentine belt.

2. The tool of claim 1, wherein the hollow pipe is made of aluminum.

3. The tool of claim 1, wherein the rod is made of steel.

4. The toot of claim 1 wherein the first gripping member and the second gripping member form an F-shape as configured.

5. A tool for handling a serpentine belt comprising:
a hollow pipe having a longitudinal opening configured at a distal end portion thereof, the hollow pipe comprising,
a first gripping member configured at the distal end portion of the hollow pipe and projecting outwards from the longitudinal opening in a substantially perpendicular direction to the hollow pipe; and
a sleeve member configured at a proximal end portion thereof;
a rod partially enclosed within the hollow pipe, the rod comprising a second gripping member configured at a distal end portion thereof in a spaced relationship to the first gripping member, the second gripping member projecting outwards from the longitudinal opening in a substantially perpendicular direction to the rod and in a parallel configuration with the first gripping member;
a handle member configured at a proximal end portion of the rod for providing relative movement of the rod within the hollow pipe; and
a spring member disposed between the sleeve member and the handle member, the spring member capable of being compressed upon directing the handle member toward the sleeve member, and retracted upon releasing the handle member,
wherein upon directing the handle member toward the sleeve member, the second gripping member moves toward the first gripping member to hold the serpentine belt therebetween for handling the serpentine belt.

6. A tool for handling a serpentine belt comprising:
a hollow pipe having a longitudinal opening configured at a distal end portion thereof, the hollow pipe comprising,
a first gripping member configured at the distal end portion of the hollow pipe and projecting outwards from the longitudinal opening in a substantially perpendicular direction to the hollow pipe; and
a sleeve member configured at a proximal end portion thereof;
a rod partially enclosed within the hollow pipe, the rod comprising a second gripping member configured at a distal end portion thereof in a spaced relationship to the first gripping member, the second gripping member projecting outwards from the longitudinal opening in a substantially perpendicular direction to the rod;
a handle member configured at a proximal end portion of the rod for providing relative movement of the rod within the hollow pipe,
wherein upon directing the handle member toward the sleeve member, the second gripping member moves axially toward the first gripping member to hold the serpentine belt therebetween for handling the serpentine belt.

7. The tool of claim 6 further comprising a spring member disposed between the sleeve member and the handle member, the spring member capable of being compressed upon directing the handle member toward the sleeve member, and retracted upon releasing the handle member.

* * * * *

UNITED STATES PATENT AND TRADEMARK OFFICE
CERTIFICATE OF CORRECTION

PATENT NO. : 8,403,784 B2
APPLICATION NO. : 12/551706
DATED : March 26, 2013
INVENTOR(S) : Peter J. Conneely It is certified that error appears in the above-identified patent and that said Letters Patent is hereby corrected as shown below:

In the Claims:

Column 5; Claim 4; Line 54;   Please delete "toot" and insert --tool--.

Signed and Sealed this
Fourteenth Day of May, 2013

Teresa Stanek Rea
*Acting Director of the United States Patent and Trademark Office*